US010921177B1

(12) United States Patent
Barkan et al.

(10) Patent No.: US 10,921,177 B1
(45) Date of Patent: Feb. 16, 2021

(54) BARCODE READER WITH OFF-PLATTER DETECTION

(71) Applicant: ZEBRA TECHNOLOGIES CORPORATION, Lincolnshire, IL (US)

(72) Inventors: Edward Barkan, Miller Place, NY (US); Darran Michael Handshaw, Sound Beach, NY (US); Mark Drzymala, Saint James, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/723,999

(22) Filed: Dec. 20, 2019

(51) Int. Cl.
| | | |
|---|---|---|
| *G01G 19/414* | (2006.01) | |
| *G06K 7/10* | (2006.01) | |
| *G06T 7/13* | (2017.01) | |
| *G01G 19/415* | (2006.01) | |
| *G01G 21/28* | (2006.01) | |
| *G01G 21/22* | (2006.01) | |

(52) U.S. Cl.
CPC ....... *G01G 19/4144* (2013.01); *G01G 19/415* (2013.01); *G01G 21/22* (2013.01); *G01G 21/283* (2013.01); *G06K 7/10722* (2013.01); *G06T 7/13* (2017.01)

(58) Field of Classification Search
CPC ... G01G 19/4144; G06K 7/10722; G06T 7/13

USPC .................................................. 235/462.43
See application file for complete search history.

(56) References Cited

U.S. PATENT DOCUMENTS

| | | | |
|---|---|---|---|
| 8,430,318 B2 | 4/2013 | McQueen et al. | |
| 8,556,175 B2 | 10/2013 | McQueen et al. | |
| 8,561,902 B2 | 10/2013 | McQueen et al. | |
| 8,833,659 B2 | 9/2014 | McQueen et al. | |
| 9,064,395 B2 | 6/2015 | Shearin et al. | |
| 2017/0068863 A1* | 3/2017 | Rattner | G06K 9/00838 |
| 2019/0236531 A1* | 8/2019 | Adato | G06Q 10/087 |

* cited by examiner

*Primary Examiner* — Toan C Ly
(74) *Attorney, Agent, or Firm* — Yuri Astvatsaturov

(57) ABSTRACT

A barcode reader has a housing, a weigh platter, and an off-platter detection assembly including an imaging assembly in communication with a controller. The imaging assembly has an imager configured to capture an image of first and second lateral edges of the weigh platter and having a field-of-view extending over an upper surface of the weigh platter. The controller is configured to: identify and locate the first and second lateral edges based upon a training image; receive the image from the imager; allow the measured weight to be recorded if determined that a footprint of an object positioned on the weigh platter does not extend over the first and second lateral edges based on the image; and prevent the measured weight from being recorded and/or providing and alert to a user if determined that the footprint of the object does extend over the first and/or second lateral edges.

26 Claims, 9 Drawing Sheets

BARCODE READER WITH OFF-PLATTER DETECTION

FIELD OF THE DISCLOSURE

The present patent relates generally to barcode readers and, in particular, to barcode readers having off-platter detection.

BACKGROUND

One of the functions of a barcode reader having a weigh platter is to weigh produce or other products that are priced by weight in order to assist in determining the price of the produce or product. However, produce and products are varied in shape and size and there can be issues where part of the produce or product sits off of the weigh platter, resulting in incorrect weight measurement and, therefore, incorrect pricing. Therefore, there is a need to be able to identify when produce or products being weighed on a weigh platter of a barcode scanner extend off of the weigh platter during the weighing process to reduce or eliminate instances of incorrect weight measurement and pricing.

SUMMARY

In an embodiment, the present invention is a barcode reader configured to be supported by a workstation, the barcode reader comprising a housing, a weigh platter configured to measure a weight of an object placed on the weigh platter, and an off-platter detection assembly. The housing has a lower housing and an upper housing extending above the lower housing. The weigh platter is positioned within the lower housing and has an upper surface facing a product scanning region, a proximal edge adjacent the upper housing, a first lateral edge extending non-parallel to the proximal edge, a second lateral edge, opposite the first lateral edge, extending non-parallel to the proximal edge, and a distal edge, opposite the proximal edge, extending non-parallel to the first lateral edge and the second lateral edge. The off-platter detection assembly includes an imaging assembly in communication with a controller. The imaging assembly is positioned within the upper housing and includes an imager having a field-of-view extending over the upper surface of the weigh platter and configured to capture an image of the first lateral edge and the second lateral edge of the weigh platter within the field-of-view. The field-of-view has an upper boundary, a lower boundary, a first lateral boundary, and a second lateral boundary, the imager. The controller is configured to: identify and locate the first and second lateral edges based upon a training image of the upper surface of the weigh platter within the field-of-view, the training image comprising an image of the weigh platter without an object and the first and second lateral edges within the field-of-view; receive the image from the imager; allow the measured weight to be recorded by a host system operatively coupled to the controller in response to the controller determining that a footprint of an object positioned on the weigh platter does not extend over the first and second lateral edges based on the image; and prevent the measured weight from being recorded by the host system and/or providing and alert to a user in response to the controller determining that the footprint of the object does extend over the first and/or second lateral edges based on the image.

In another embodiment, the present invention is a barcode reader configured to be supported by a workstation, the barcode reader comprising a housing, a weigh platter configured to measure a weight of an object placed on the weigh platter, and an off-platter detection assembly. The housing has a lower housing and an upper housing extending above the lower housing. The weigh platter is positioned within the lower housing and has an upper surface facing a product scanning region, a proximal edge adjacent the upper housing, a first lateral edge extending non-parallel to the proximal edge, a second lateral edge, opposite the first lateral edge, extending non-parallel to the proximal edge, and a distal edge, opposite the proximal edge, extending non-parallel to the first lateral edge and the second lateral edge. The off-platter detection assembly includes an overhead imaging assembly in communication with a controller. The overhead imaging assembly is positioned above the weigh platter and includes an imager configured to capture an image of the upper surface of the weigh platter and having a field-of-view extending downward towards the upper surface of the weigh platter. The field-of-view has a central axis that extends perpendicular to the upper surface, the imager, including the first lateral edge and the second lateral edge, within the field-of-view. The controller is configured to: identify and locate the first and second lateral edges based upon a training image of the upper surface of the weigh platter within the field-of-view, the training image comprising an image of the weigh platter without an object and the first and second lateral edges within the field-of-view; receive the image from the imager; allow the measured weight to be recorded by a host system operatively coupled to the controller in response to the controller determining that an object positioned on the weigh platter does not extend over the first and second lateral edges based on the image; and prevent the measured weight from being recorded by the host system and/or providing and alert to a user in response to the controller determining that the object positioned on the weigh platter does extend over the first and/or second lateral edges based on the image.

In yet another embodiment, the present invention is a barcode reader configured to be supported by a workstation, the barcode reader comprising a housing, a weigh platter configured to measure a weight of an object placed on the weigh platter, and an off-platter detection assembly. The housing has a lower housing and an upper housing extending above the lower housing. The weigh platter is positioned within the lower housing and has an upper surface facing a product scanning region, a proximal edge adjacent the upper housing, a first lateral edge extending non-parallel to the proximal edge, a second lateral edge, opposite the first lateral edge, extending non-parallel to the proximal edge, and a distal edge, opposite the proximal edge, extending non-parallel to the first lateral edge and the second lateral edge. The off-platter detection assembly includes an imaging assembly and an overhead imaging assembly, both in communication with a controller. The imaging assembly is positioned within the upper housing and includes a first imager having a first field-of-view extending over the upper surface of the weigh platter, the first imager configured to capture a first image of the first lateral edge and the second lateral edge of the weigh platter within the first field-of-view. The first field-of-view has an upper boundary, a lower boundary that extends generally parallel to the upper surface, a first lateral boundary, and a second lateral boundary. The overhead imaging assembly is positioned above the weigh platter and includes a second imager having a second field-of-view extending downward towards the upper surface of the weigh platter, the second imager configured to capture a second image of the upper surface of the weigh platter, including the first lateral edge and the second lateral edge, within the second field-of-view. The second field-of-view has a central axis that extends perpendicular to the upper surface. The controller is configured to: identify and locate the first and second lateral edges based upon a first training image of the upper surface of the weigh platter within the first field-of-view, the first training image comprising an image of the weigh platter without an object and the first and second lateral edges within the first field-of-view; identify and locate the first and second lateral edges based upon a second training image of the upper surface of the weigh platter within the second field-of-view, the second training image comprising an image of the upper surface of the weigh platter without an object and the first and second lateral edges within the second field-of-view; receive the first image from the first imager and the second image from the second imager; allow the measured weight to be recorded by a host system operatively coupled to the controller in response to: (1) the controller determining that a footprint of an object positioned on the weigh platter does not extend over the first and second lateral edges based on the first image; and/or (2) the controller determining that the object positioned on the weigh platter does not extend over the first and second lateral edges based on the second image; and prevent the measured weight from being recorded by the host system and/or providing an alert to a user in response to: (1) the controller determining that the footprint of the object does extend over one of the first and/or second lateral edges based on the first image; and (2) the controller determining that the object does extend over the one of the first and/or second lateral edges based on the second image.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed examples, and explain various principles and advantages of those embodiments.

Figure 1:
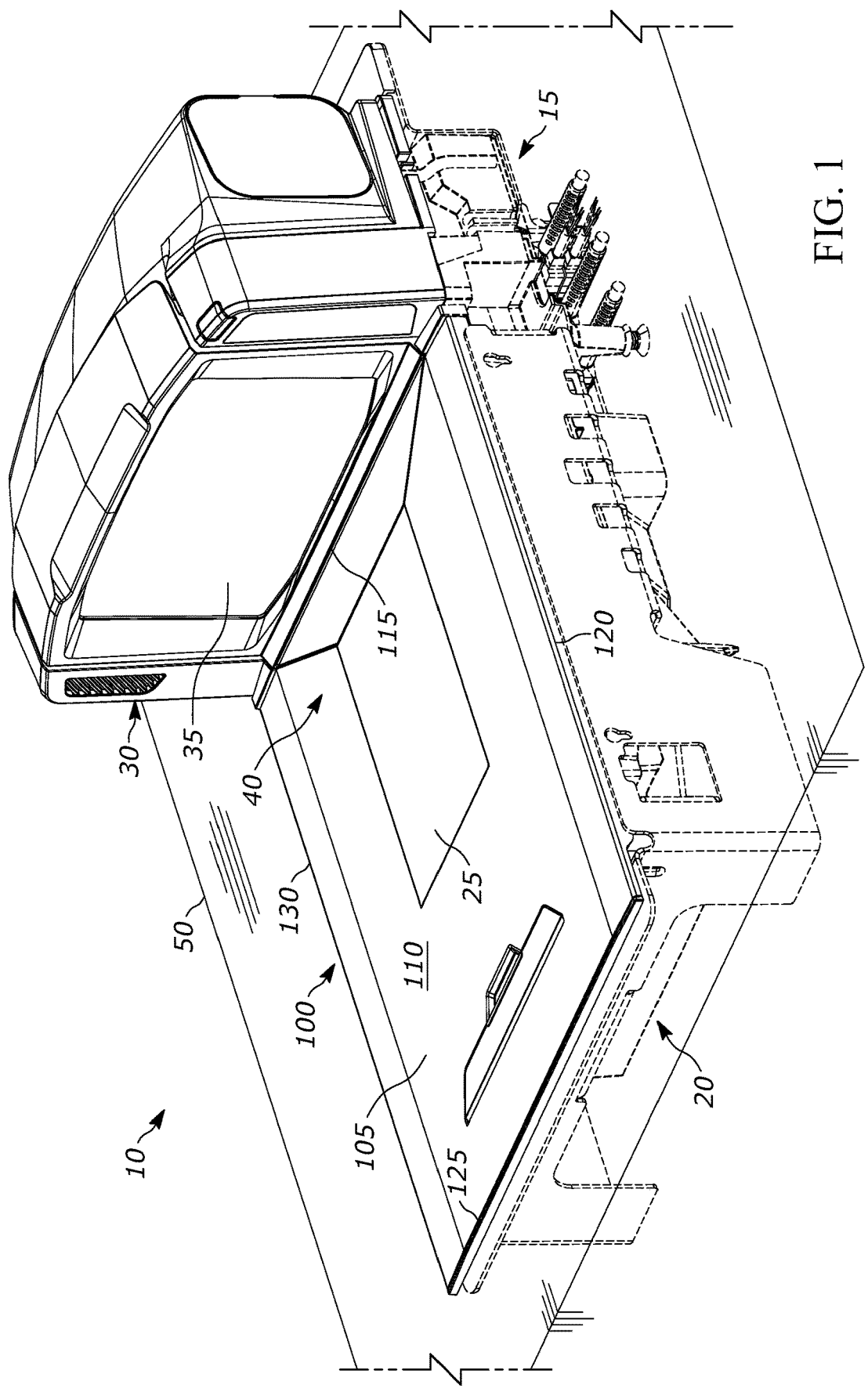
FIG. 1 illustrates a front perspective view of an example barcode reader supported by a workstation.

The apparatus and method components have been represented where appropriate by conventional symbols in the drawings, showing only those specific details that are pertinent to understanding the disclosed examples so as not to obscure the disclosure with details that will be readily apparent to those of ordinary skill in the art having the benefit of the description herein.

DETAILED DESCRIPTION

The examples disclosed herein relate to barcode readers having weigh platter assemblies and off-platter detection assemblies to identify when an object extends off of a lateral edge of the weigh platter of the weigh platter assembly. The examples herein use cameras, which can be part of an off-platter detection assembly or cameras existing in the barcode reader for object recognition, to view objects placed on the weigh platter and determine from images from the cameras whether there is an off platter event.

Referring to FIG. 1, an example barcode reader 10, such as the Zebra® MP7000 bioptic barcode reader, is shown that can be configured to be supported by a workstation 50, such as a checkout counter at a point-of-sale (POS) of a retail store, and has a product scanning region 40. Barcode reader 10 includes a housing 15 and a weigh platter assembly 100. Housing 15 includes a lower housing 20 that houses weigh platter assembly 100 and an upper housing 30 that extends above lower housing 20. Upper housing 30 includes a generally upright window 35 configured to allow a first light to pass between product scanning region 40 and an interior region 45 of housing 15. In addition, if barcode reader 10 is a bioptic barcode reader, lower housing 20 will include a generally horizontal window 25, which in the example shown is positioned in a weigh platter 105 of weigh platter assembly 100, configured to allow a second light to pass between product scanning region 40 and interior region 45 of housing 15. The first and second lights intersect to define product scanning region 40 of barcode reader 10 where a product can be scanned for sale at the POS.

Weigh platter assembly 100 includes weigh platter 105 positioned within lower housing 20, which is configured to measure the weight of an object placed on weigh platter 105. Weigh platter 105 has a upper surface 110 that is generally parallel to a top surface of workstation 50 and faces product scanning region 40, a proximal edge 115, a first lateral edge 120, a second lateral edge 130, and a distal edge 125. In the example shown, proximal edge 115 is adjacent upper housing 30 and would be the edge furthest from a user of weigh platter assembly 100 and/or barcode reader 10. First lateral edge 120 extends non-parallel to proximal edge 115. Second lateral edge 130 also extends non-parallel to proximal edge 155 and is opposite first lateral edge 120. Distal edge 125 is opposite proximal edge 115, would be the edge closest to the user, and extends non-parallel to first lateral edge 120 and second lateral edge 130. In the example shown, weigh platter 105 is generally rectangular and first lateral edge 120 and second lateral edge 130 are perpendicular to proximal edge 115 and distal edge 125 is perpendicular to first lateral edge 120 and second lateral edge 130 and parallel to proximal edge 115.

Figure 2:
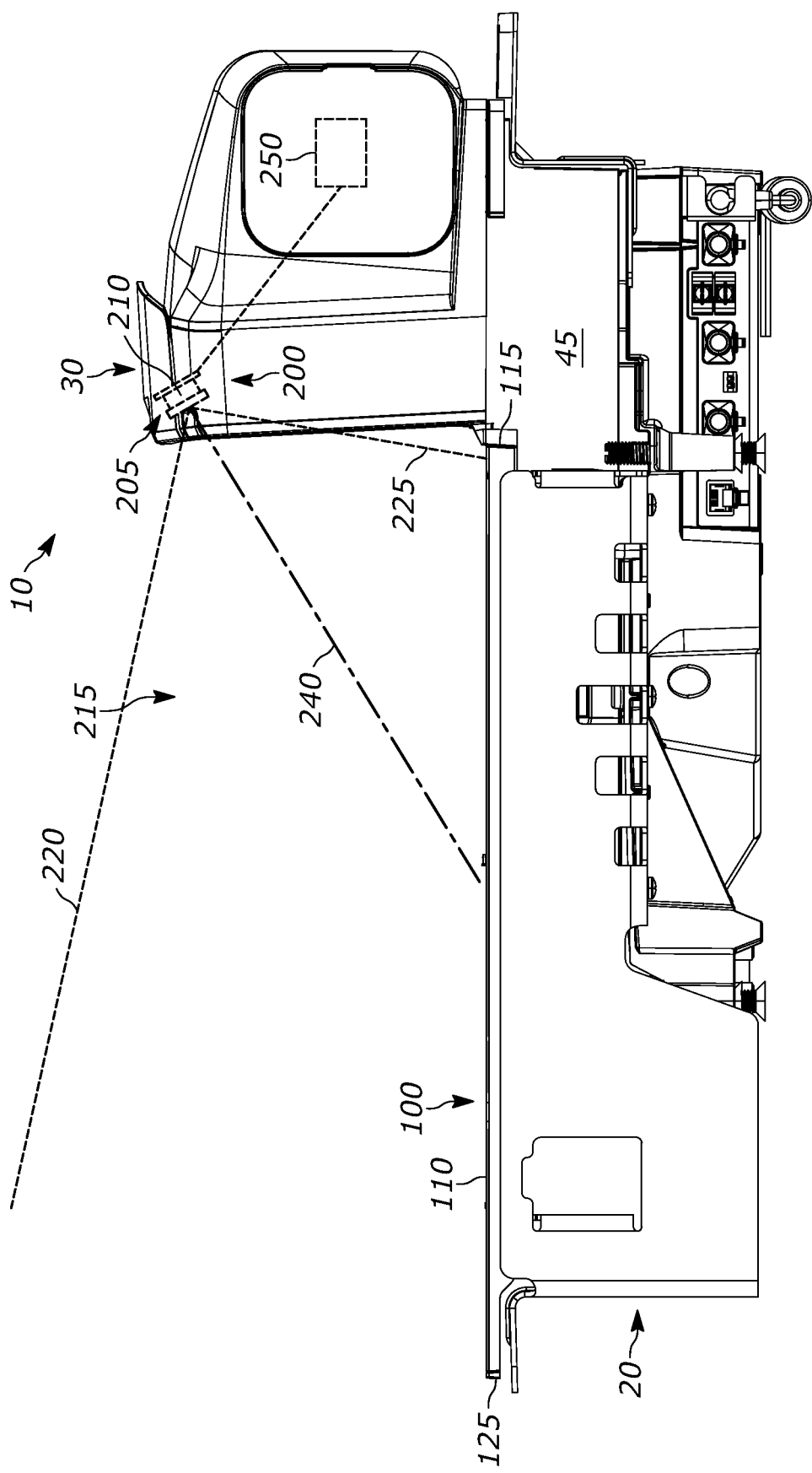
FIG. 2 illustrates a side view of the barcode reader of FIG. 1 with a first example off-platter detection assembly.
Figure 3:
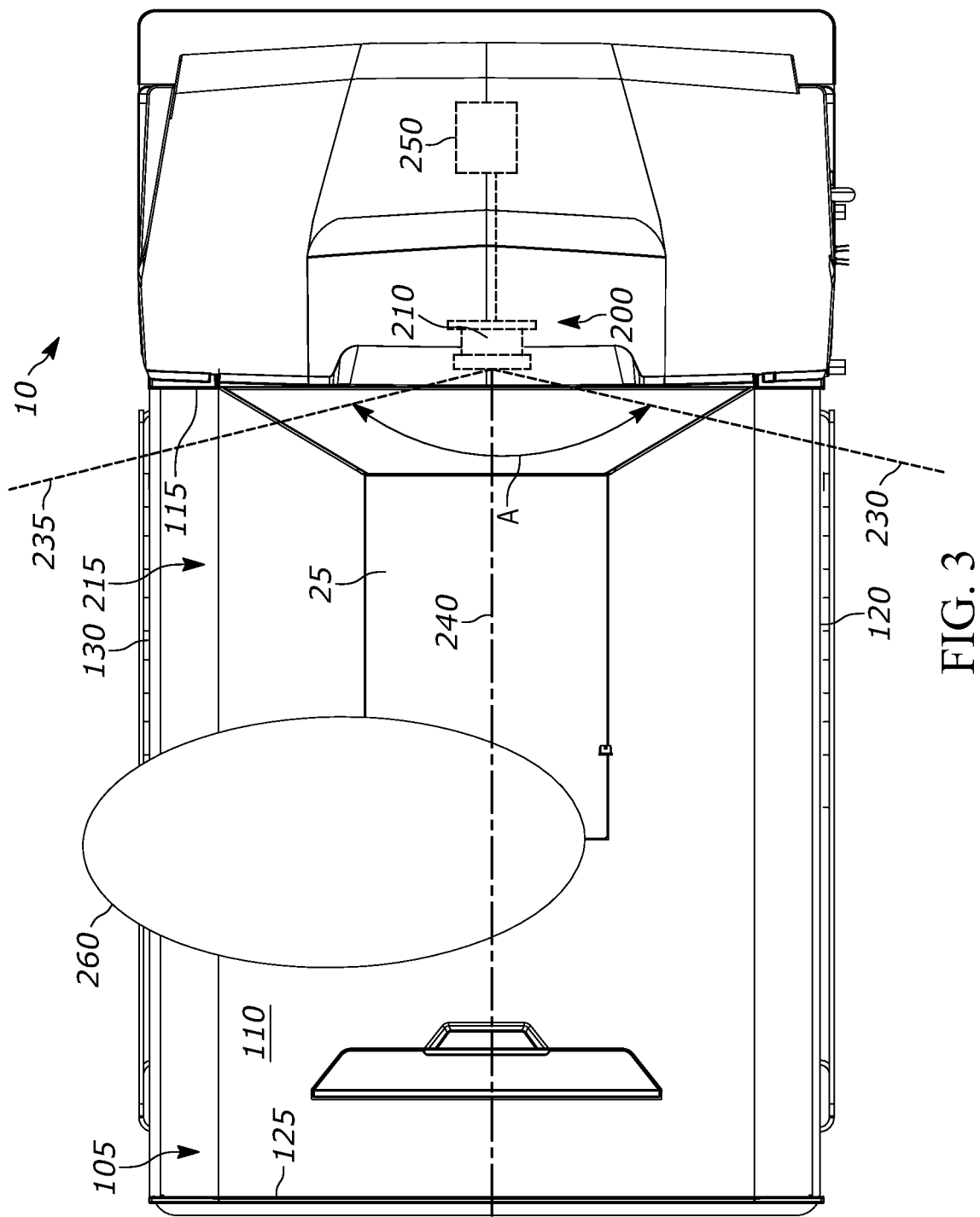
FIG. 3 illustrates a top view of the barcode reader of FIG. 2 with an object positioned on the weigh platter.
Figure 4:
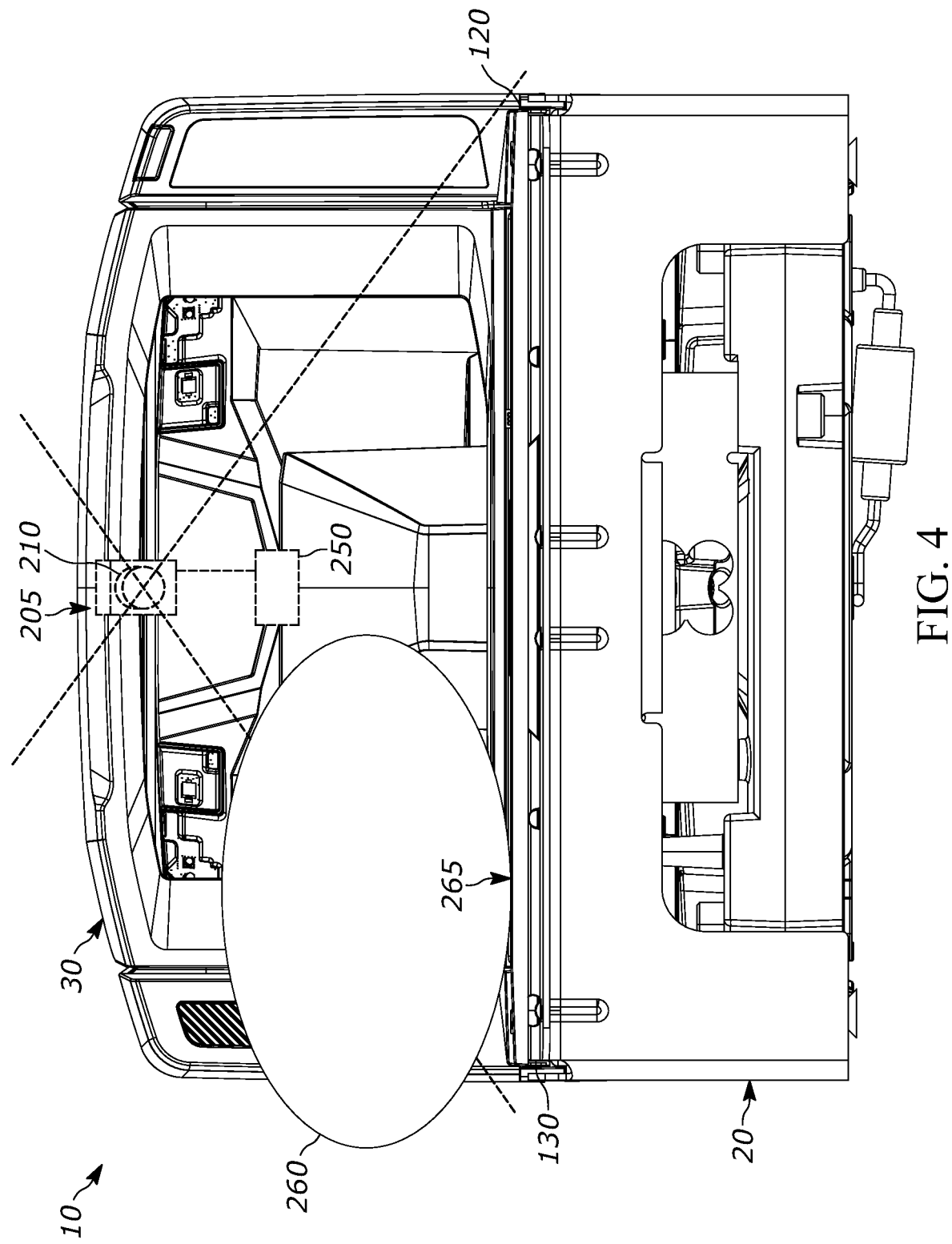
FIG. 4 illustrates a front view of the barcode reader of FIG. 3.

Referring to FIGS. 2-4, barcode reader 10 is illustrated with a first example off-platter detection assembly 200 that generally includes an imaging assembly 205 and a controller 250 in communication with imaging assembly 205. Imaging assembly 205 can be an imaging assembly that is dedicated to off-platter detection assembly 200 or an imaging assembly that is already part of barcode reader 10 and used for object recognition and is positioned within upper housing 30. Imaging assembly 205 includes an imager 210, preferably a 2 mega pixel camera, that has a field-of-view 215 that extends over upper surface 110 of weigh platter 105. Imager 210 is configured to capture an image of upper surface 110 of weigh platter 105, including first lateral edge 120 and second lateral edge 130, within field-of-view 215, which has an upper boundary 220, a lower boundary 225, opposite upper boundary 220, a first lateral boundary 230, and a second lateral boundary 235, opposite first lateral boundary 230. To provide the maximum amount of lateral coverage of upper surface 110, field-of-view 215 preferably has a field-of-view angle A between first lateral boundary 230 and second lateral boundary 235 that is within the range of 100 degrees and 135 degrees.

In the example shown, imaging assembly 205 is positioned high in an upper portion of upper housing 30 such that a central axis 240 of field-of-view 215 is aimed downward toward upper surface 110 of weigh platter 105. To provide the maximum amount of longitudinal coverage of upper surface 110, central axis 240 would preferably be aligned such that lower boundary 225 of field-of-view 215 intersects upper surface 110 of weigh platter 105 at or substantially adjacent proximal edge 115 (e.g., within the range of 0-30 mm of proximal edge 115) and upper boundary 220 extends to or beyond distal edge 125. This configuration may be required in barcode scanners with certain mirror arrangements where positioning imaging assembly 205 lower in upper housing 30 would block the mirror arrangement and limit or impede the field-of-view of the barcode scanner. Alternatively, in barcode scanners where the mirror arrangement may be higher in upper housing 30 or can be altered as such, imaging assembly 205 could also be positioned low in a lower portion of upper housing 30 such that the central axis extends upward above upper surface 110 (e.g., at an angle within the range of 15-25 degrees relative to upper surface 110) and lower boundary 225 is substantially adjacent and parallel to upper surface 110, as described in detail below for imaging assembly 405. This configuration can be beneficial in that the field-of-view of imager is aligned along upper surface 110 and has a better view of the footprint of objects placed on weigh platter 105.

Controller 250 is in communication with imaging assembly 205 and can be calibrated initially (at the factory or during installation or final testing) by being configured to identify and locate first lateral edge 120 and second lateral edge 130 based on a training image of upper surface 110 of weigh platter 105 within field-of-view 215. The training image is an image of upper surface 110 of weigh platter 105 without an object placed on weigh platter 105 and first lateral edge 120 and second lateral edge 130 within field-of-view 215. For example, the location of the first and second lateral edges 120, 130 can be identified by a user observing the training image by drawing or indicating lies on the training image using a configuration tool or the first and second lateral edges 120, 130 could be detected automatically by controller 250.

Controller 250 can also be configured to receive an image from imager 210 and determine if a footprint 265 of an object 260 positioned on weigh platter 105, which is the portion of object 260 that contacts weigh platter 105, extends over first or second lateral edges 120, 130. Controller 250 can be configured to determine if footprint 265 extends over first or second lateral edges 120, 130 by determining if part of the first or second lateral edges 120, 130 or the gap between weigh platter 105 and lower housing 20 or workstation 50, determined during calibration based on the training image, is blocked or not visible. Controller 250 can also use a convolutional neural network (CNN) to determine whether footprint 265 extends over first or second lateral edges 120, 130, for example, by identifying object 260 and its orientation and comparing it against a database of dimensional data to determine whether footprint 265 crosses first or second lateral edges 120, 130. If controller 250 determines that footprint 265 of object 260 does not extend over either first or second lateral edges 120, 130, controller 250 can be configured to allow the measured weight of object 260 to be recorded, for example, by a host system operatively coupled to controller 250. If controller 250 determines that footprint 265 of object 260 does extend over first lateral edge 120 and/or second lateral edge 130, controller 250 can be configured to prevent the measured weight of object 260 from being recorded, for example, by the host system, and/or provide an alert to a user, such as by some type of visual or audio alert.

Figure 5:
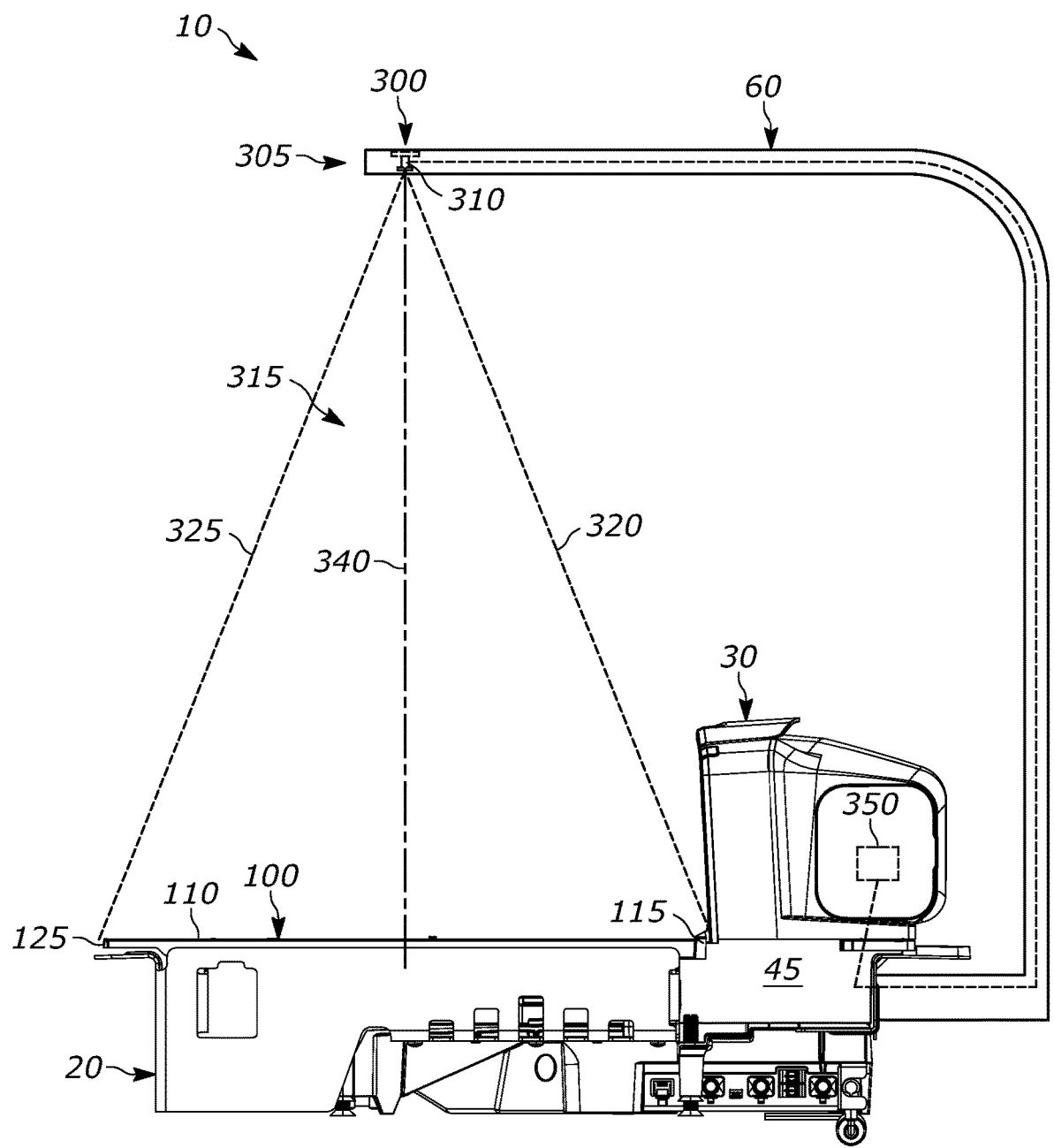
FIG. 5 illustrates a side view of the barcode reader of FIG. 1 with a second example off-platter detection assembly.
Figure 6:
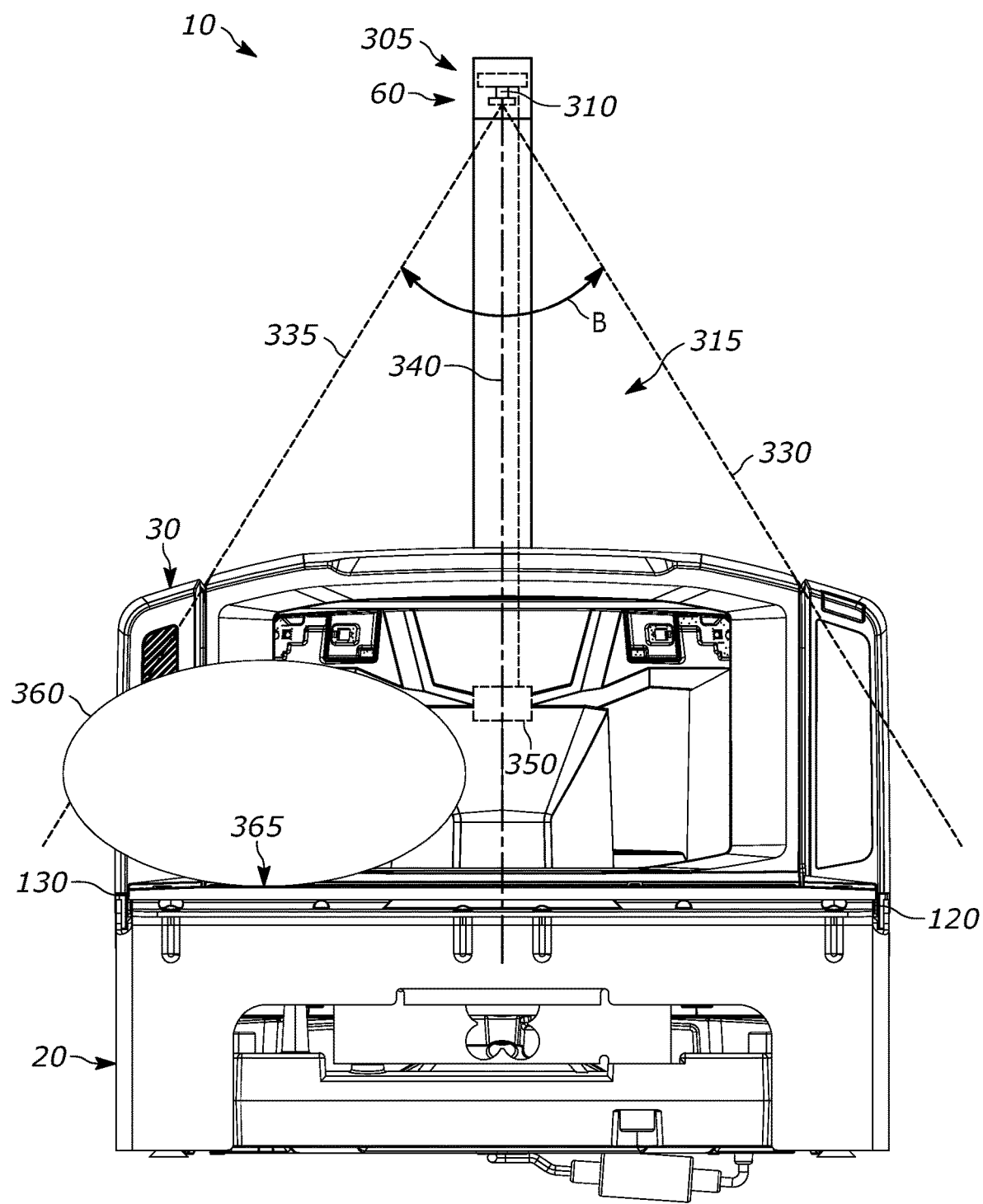
FIG. 6 illustrates a front view of the barcode reader of FIG. 5 with an object positioned on the weigh platter.

Referring to FIGS. 5-6, barcode reader 10 is illustrated with a second example off-platter detection assembly 300 that generally includes an overhead imaging assembly 305 and a controller 350 in communication with overhead imaging assembly 305, which is positioned substantially above weigh platter 105 and looks down on weigh platter 105. Positioning overhead imaging assembly 305 above and looking down on weigh platter 105 locates overhead imaging assembly 305 far enough above tall items being weighted so as to reduce the chance that a tall object would falsely trigger off-platter detection assembly 300. Overhead imaging assembly 305 can be an imaging assembly that is dedicated to off-platter detection assembly 300 or an imaging assembly that is already part of barcode reader 10 and used for object recognition and is positioned above and looking down on weigh platter 105. Overhead imaging assembly 305 includes an imager 310, preferably a 2 mega pixel camera, that has a field-of-view 315 that extends downward towards upper surface 110 of weigh platter 105 and is configured to capture an image of upper surface 110 of weigh platter 105, including first lateral edge 120 and second lateral edge 130, within field-of-view 315. Field-of-view 315 has a proximal boundary 320, a distal boundary 325, opposite proximal boundary 320, a first lateral boundary 330, and a second lateral boundary 335, opposite first lateral boundary 330. To provide the maximum amount of lateral coverage of upper surface 110, field-of-view 315 preferably has a transverse field-of-view angle B between first lateral boundary 330 and second lateral boundary 335 that is within the range of 100 degrees and 135 degrees.

In the example shown, barcode reader 10 includes a gooseneck post 60 that extends from a back of housing 15 and extends over weigh platter 105 and overhead imaging assembly 305 is positioned within gooseneck post 60 such that a central axis 340 of field-of-view 315 extends generally perpendicular to upper surface 110 of weigh platter 105. Alternatively, rather than being positioned within gooseneck post 60, overhead imaging assembly 305 could be mounted or positioned in any position above and looking down on weigh platter 105, such as in a ceiling or as part of an overhead object recognition system or security system overlooking weigh platter 105. To provide the maximum amount of longitudinal coverage of upper surface 110, overhead imaging assembly 305 can be positioned such that proximal boundary 320 of field-of-view 315 intersects upper surface 110 of weigh platter 105 at or substantially adjacent proximal edge 115 (e.g., within the range of 0-30 mm of proximal edge 115) and distal boundary 325 extends to or beyond distal edge 125.

Controller 350 is in communication with overhead imaging assembly 305 and can be calibrated initially (at the factory or during installation or final testing) by being configured to identify and locate first lateral edge 120 and second lateral edge 130 based on a training image of upper surface 110 of weigh platter 105 within field-of-view 315. The training image is an image of upper surface 110 of weigh platter 105 without an object placed on weigh platter 105 and first lateral edge 120 and second lateral edge 130 within field-of-view 315. For example, the location of the first and second lateral edges 120, 130 can be identified by a user observing the training image by drawing or indicating lies on the training image using a configuration tool or the first and second lateral edges 120, 130 could be detected automatically by controller 350.

Controller 350 can also be configured to receive an image from imager 310 and determine if an object 260 positioned on weigh platter 105 extends over first or second lateral edges 120, 130. Controller 350 can be configured to determine if object 360 extends over first or second lateral edges 120, 130 by determining if part of the first or second lateral edges 120, 130 or the gap between weigh platter 105 and lower housing 20 or workstation 50, determined during calibration based on the training image, is blocked or not visible. Controller 350 can also use a convolutional neural network (CNN) to determine whether object 360 extends over first or second lateral edges 120, 130, for example, by identifying object 360 and its orientation and comparing it against a database of dimensional data to determine whether object 360 crosses first or second lateral edges 120, 130. If controller 350 determines that object 360 does not extend over either first or second lateral edges 120, 130, controller 350 can be configured to allow the measured weight of object 360 to be recorded, for example, by a host system operatively coupled to controller 350. If controller 350 determines that object 360 does extend over first lateral edge 120 and/or second lateral edge 130, controller 350 can be configured to prevent the measured weight of object 360 from being recorded, for example, by the host system, and/or provide an alert to a user, such as by some type of visual or audio alert.

Figure 7:
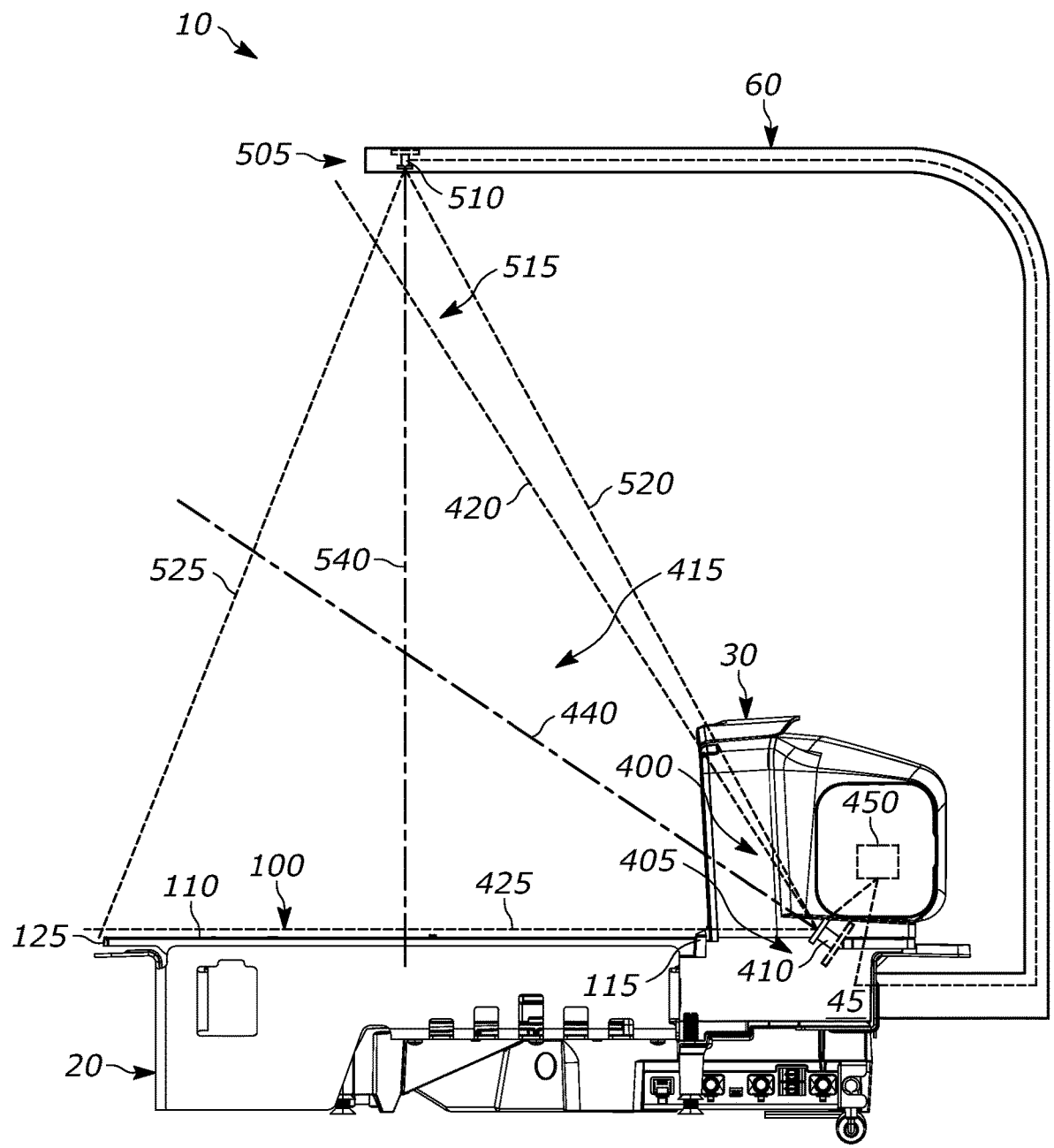
FIG. 7 illustrates a side view of the barcode reader of FIG. 1 with a third example off-platter detection assembly.
Figure 8:
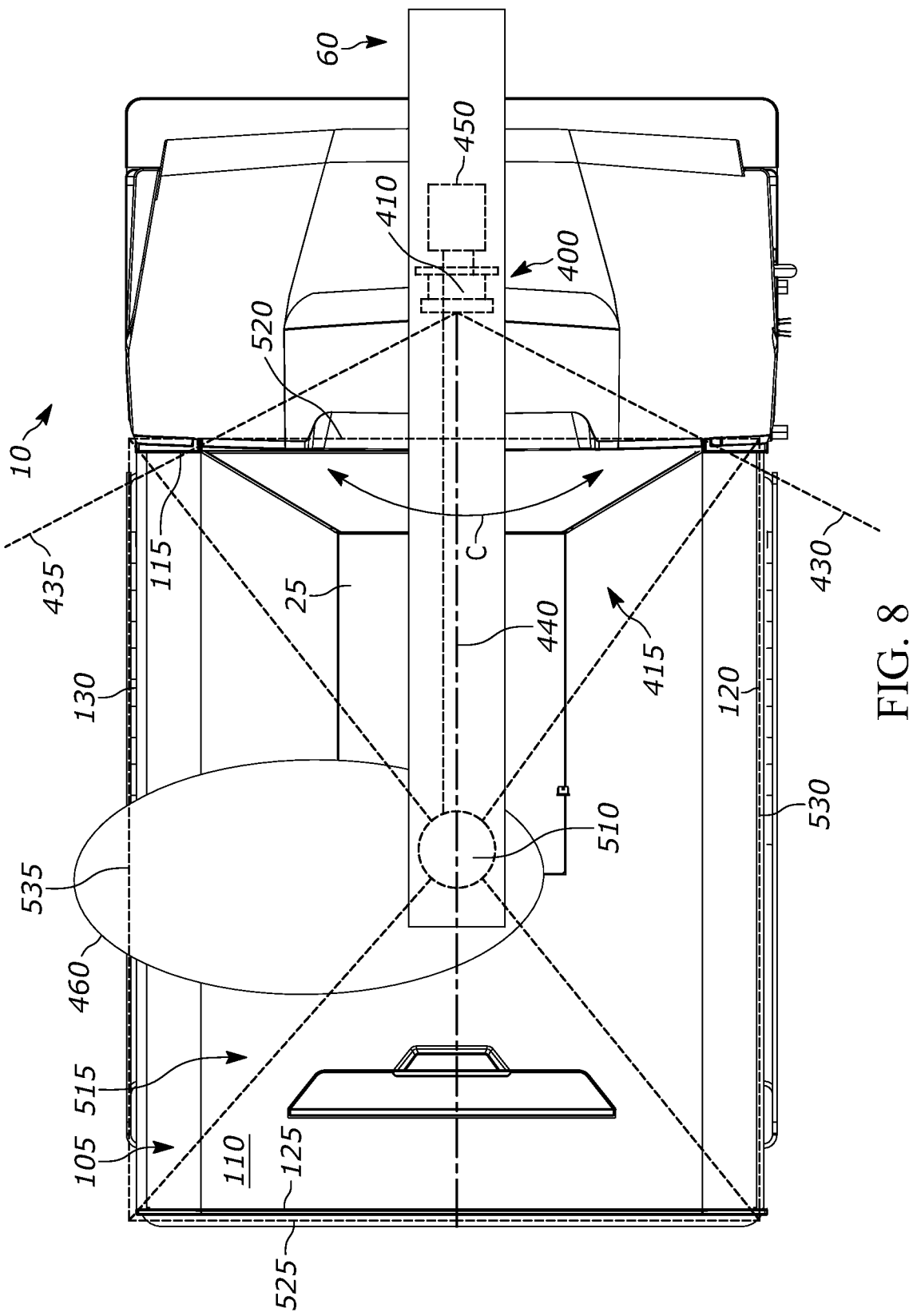
FIG. 8 illustrates a top view of the barcode reader of FIG. 7 with an object positioned on the weigh platter.
Figure 9:
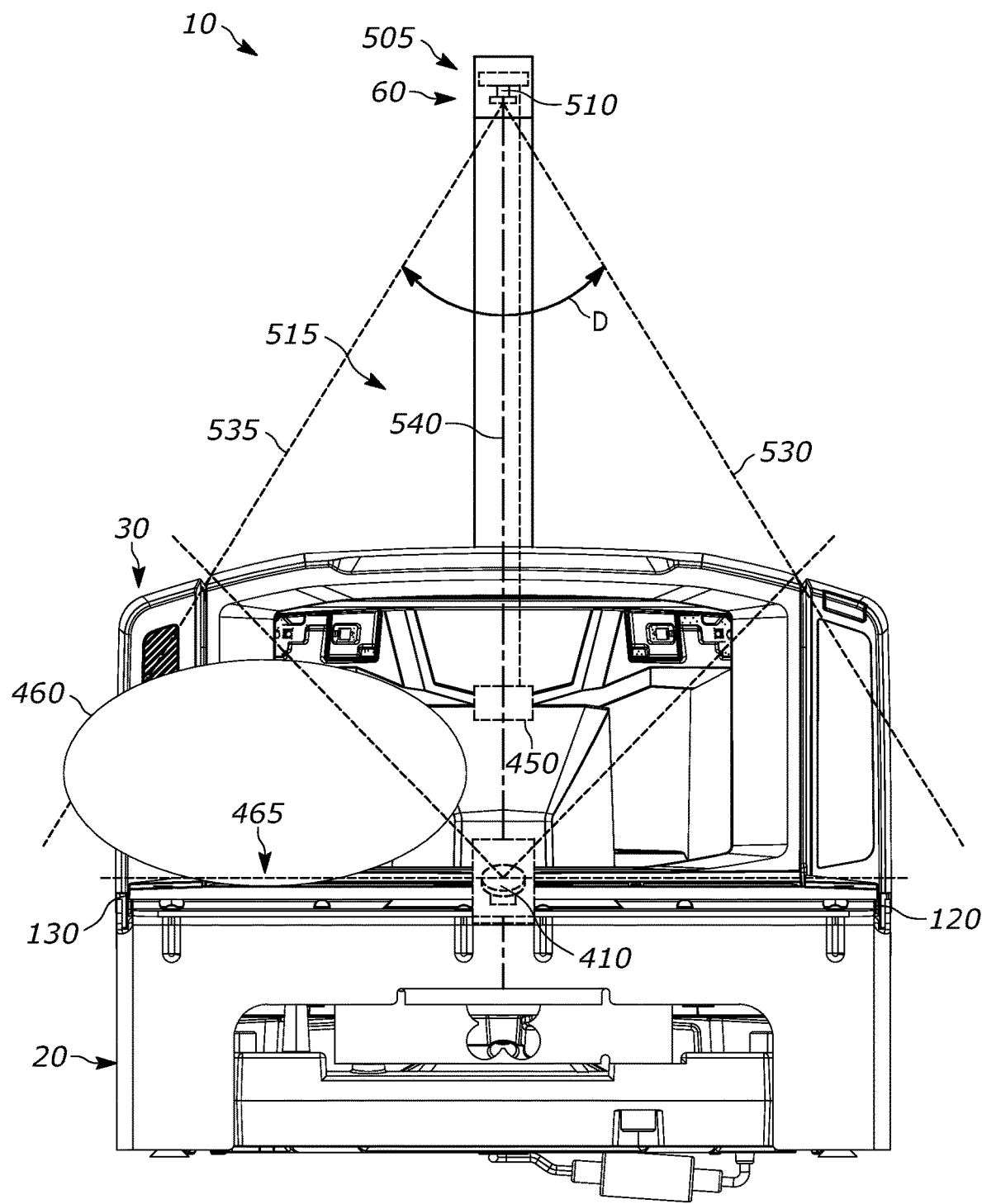
FIG. 9 illustrates a front view of the barcode reader of FIG. 8.

Referring to FIGS. 7-9, barcode reader 10 is illustrated with a third example off-platter detection assembly 400 that generally includes an imaging assembly 405, an overhead imaging assembly 505, and a controller 450 in communication with imaging assembly 405 and overhead imaging assembly 505. Using both imaging assembly 405 and overhead imaging assembly 505 provides more data and creates a redundancy to eliminate false off-platter alerts. Imaging assembly 405 can be an imaging assembly that is dedicated to off-platter detection assembly 400 or an imaging assembly that is already part of barcode reader 10 and used for object recognition and is positioned within upper housing 30. Imaging assembly 405 includes a first imager 410, preferably a 2 mega pixel camera, that has a first field-of-view 415 that extends over upper surface 110 of weigh platter 105. First imager 410 is configured to capture an image of upper surface 110 of weigh platter 105, including first lateral edge 120 and second lateral edge 130, within first field-of-view 415, which has an upper boundary 420, a lower boundary 425 that extends generally parallel to upper surface 110, opposite upper boundary 420, a first lateral boundary 430, and a second lateral boundary 435, opposite first lateral boundary 430. To provide the maximum amount of lateral coverage of upper surface 110, first field-of-view 415 preferably has a field-of-view angle C between first lateral boundary 430 and second lateral boundary 435 that is within the range of 100 degrees and 135 degrees.

In the example shown, imaging assembly 405 is positioned low in a lower portion of upper housing 30 such that central axis 440 of first field-of-view 415 extends upward above upper surface 110 (e.g., at an angle within the range of 15-25 degrees relative to upper surface 110) and lower boundary 425 is substantially adjacent and parallel to upper surface 110. This configuration can be beneficial in that first field-of-view 415 of first imager 410 is aligned along upper surface 110 and has a better view of the footprint of objects placed on weigh platter 105. Alternatively, imaging assembly 405 could be positioned high in an upper portion of upper housing 30 such that the central axis is aimed downward toward upper surface 110 of weigh platter 105, as discussed for imaging assembly 205 above. In this configuration, to provide the maximum amount of longitudinal coverage of upper surface 110, the central axis would preferably be aligned such that lower boundary 425 of first field-of-view 415 intersects upper surface 110 of weigh platter 105 at or substantially adjacent proximal edge 115 (e.g., within the range of 0-30 mm of proximal edge 115) and upper boundary 420 extends to or beyond distal edge 125. This configuration may be required in barcode scanners with certain mirror arrangements where positioning imaging assembly 405 lower in upper housing 30 would block the mirror arrangement and limit or impede the field-of-view of the barcode scanner.

Overhead imaging assembly 505 is positioned substantially above weigh platter 105 and looks down on weigh platter 105. Positioning overhead imaging assembly 305 above and looking down on weigh platter 105 locates overhead imaging assembly 505 far enough above tall items being weighted so as to reduce the chance that a tall object would falsely trigger off-platter detection assembly 400. Overhead imaging assembly 505 can be an imaging assembly that is dedicated to off-platter detection assembly 400 or an imaging assembly that is already part of barcode reader 10 and used for object recognition and is positioned above and looking down on weigh platter 105. Overhead imaging assembly 505 includes a second imager 510, preferably a 2 mega pixel camera, that has a second field-of-view 515 that extends downward towards upper surface 110 of weigh platter 105 and is configured to capture an image of upper surface 110 of weigh platter 105, including first lateral edge 120 and second lateral edge 130, within second field-of-view 515. Second field-of-view 515 has a proximal boundary 520, a distal boundary 525, opposite proximal boundary 520, a first lateral boundary 530, and a second lateral boundary 535, opposite first lateral boundary 530. To provide the maximum amount of lateral coverage of upper surface 110, second field-of-view 515 preferably has a transverse field-of-view angle D between first lateral boundary 530 and second lateral boundary 535 that is within the range of 100 degrees and 135 degrees.

In the example shown, barcode reader 10 includes a gooseneck post 60 that extends from a back of housing 15 and extends over weigh platter 105 and overhead imaging assembly 505 is positioned within gooseneck post 60 such that a central axis 540 of second field-of-view 515 extends generally perpendicular to upper surface 110 of weigh platter 105. Alternatively, rather than being positioned within gooseneck post 60, overhead imaging assembly 505 could be mounted or positioned in any position above and looking down on weigh platter 105, such as in a ceiling or as part of an overhead object recognition system or security system overlooking weigh platter 105. To provide the maximum amount of longitudinal coverage of upper surface 110, overhead imaging assembly 505 can be positioned such that proximal boundary 520 of second field-of-view 515 intersects upper surface 110 of weigh platter 105 at or substantially adjacent proximal edge 115 (e.g., within the range of 0-30 mm of proximal edge 115) and distal boundary 525 extends to or beyond distal edge 125.

Controller 450 is in communication with imaging assembly 405 and overhead imaging assembly 505 and can be calibrated initially (at the factory or during installation or final testing) by being configured to identify and locate first lateral edge 120 and second lateral edge 130 based on a first training image of upper surface 110 of weigh platter 105 within first field-of-view 415 and on a second training image of upper surface 110 of weigh platter 105 within second field-of-view 515. The first training image is an image of upper surface 110 of weigh platter 105 without an object placed on weigh platter 105 and first lateral edge 120 and second lateral edge 130 within first field-of-view 415 and the second training image is an image of upper surface 110 of weigh platter 105 without an object placed on weigh platter 105 and first lateral edge 120 and second lateral edge 130 within second field-of-view 515. For example, the location of the first and second lateral edges 120, 130 can be identified by a user observing the first and second training images by drawing or indicating lies on the training image using a configuration tool or the first and second lateral edges 120, 130 could be detected automatically by controller 450.

Controller 450 can also be configured to receive a first image from first imager 410 and a second image from second imager 510 and determine if a footprint 465 of an object 460 positioned on weigh platter 105 extends over first or second lateral edges 120, 130 based on the first image and if object 460 extends over first or second lateral edges 120, 130 based on the second image. Controller 450 can be configured to determine if footprint 265 extends over first or second lateral edges 120, 130 based on the first image by determining if part of the first or second lateral edges 120, 130 or the gap between weigh platter 105 and lower housing 20 or workstation 50, determined during calibration based on the first training image, is blocked or not visible. Similarly, controller 450 can be configured to determine if object 460 extends over first or second lateral edges 120, 130 based on the second image by determining if part of the first or second lateral edges 120, 130 or the gap between weigh platter 105 and lower housing 20 or workstation 50 is blocked or not visible. Controller 450 can also use a convolutional neural network (CNN) to determine whether footprint 465 or object 460 extends over first or second lateral edges 120, 130, for example, by identifying object 460 and its orientation and comparing it against a database of dimensional data to determine whether footprint 465 or object 460 crosses first or second lateral edges 120, 130. If controller 450 determines that footprint 465 in the first image and/or object 460 in the second image does not extend over either first or second lateral edges 120, 130, controller 450 can be configured to allow the measured weight of object 460 to be recorded, for example, by a host system operatively coupled to controller 450. If controller 450 determines that footprint 465 in the first image and object 460 in the second image does extend over first lateral edge 120 and/or second lateral edge 130, controller 450 can be configured to prevent the measured weight of object 460 from being recorded, for example, by the host system, and/or provide an alert to a user, such as by some type of visual or audio alert.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations. Moreover, no steps of any method disclosed herein shall be understood to have any specific order unless it is expressly stated that no other order is possible or required by the remaining steps of the respective method. Also, at least some of the figures may or may not be drawn to scale.

The benefits, advantages, solutions to problems, and any element(s) that may cause any benefit, advantage, or solution to occur or become more pronounced are not to be construed as a critical, required, or essential features or elements of any or all the claims. The legal scope of the property right is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The patent claims at the end of this patent application are not intended to be construed under 35 U.S.C. § 112(f) unless traditional means-plus-function language is expressly recited, such as "means for" or "step for" language being explicitly recited in the claim(s).

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A barcode reader configured to be supported by a workstation, the barcode reader comprising:
   a housing having a lower housing and an upper housing extending above the lower housing;
   a weigh platter positioned within the lower housing and configured to measure a weight of an object placed on the weigh platter, the weigh platter having an upper surface facing a product scanning region, a proximal edge adjacent the upper housing, a first lateral edge extending non-parallel to the proximal edge, a second lateral edge, opposite the first lateral edge, extending non-parallel to the proximal edge, and a distal edge, opposite the proximal edge, extending non-parallel to the first lateral edge and the second lateral edge; and
   an off-platter detection assembly comprising:
   an imaging assembly positioned within the upper housing and including an imager having a field-of-view extending over the upper surface of the weigh platter, the field-of-view having an upper boundary, a lower boundary, a first lateral boundary, and a second lateral boundary, the imager configured to capture an image of the first lateral edge and the second lateral edge of the weigh platter within the field-of-view; and
   a controller in communication with the imaging assembly, the controller configured to:
   identify and locate the first and second lateral edges based upon a training image of the upper surface of the weigh platter within the field-of-view, the training image comprising an image of the weigh platter without an object and the first and second lateral edges within the field-of-view;
   receive the image from the imager;
   allow the measured weight to be recorded by a host system operatively coupled to the controller in response to the controller determining that a footprint of an object positioned on the weigh platter does not extend over the first and second lateral edges based on the image; and
   prevent the measured weight from being recorded by the host system and/or providing an alert to a user in response to the controller determining that the footprint of the object does extend over the first and/or second lateral edges based on the image.

2. The barcode reader of claim 1, wherein the field-of-view has a central axis that extends upward above the upper surface and the lower boundary of the field-of-view is substantially adjacent and substantially parallel to the upper surface.

3. The barcode reader of claim 2, wherein the central axis is aimed upward away from the upper surface at an angle within the range of 15 degrees and 25 degrees relative to the upper surface.

4. The barcode reader of claim 1, wherein the field-of-view has a central axis that is aimed downward towards the upper surface of the weigh platter.

5. The barcode reader of claim 4, wherein the lower boundary of the field-of-view intersects the upper surface of the weigh platter at or substantially adjacent to the proximal edge.

6. The barcode reader of claim 5, wherein the lower boundary of the field-of-view intersects the upper surface of the weigh platter within the range of 0 mm to the proximal edge and 30 mm to the proximal edge.

7. The barcode reader of claim 1, wherein the field-of-view comprises a field-of-view angle within the range of 100 degrees and 135 degrees.

8. The barcode reader of claim 1, wherein the barcode reader is a bioptic barcode reader and comprises:
   a generally horizontal window positioned at the upper surface of the lower housing, the generally horizontal window configured to allow a first light to pass between the product scanning region and an interior region of the housing; and
   a generally upright window positioned in the upper housing, the generally upright window configured to allow a second light to pass between the product scanning region and the interior region of the housing.

9. A barcode reader configured to be supported by a workstation, the barcode reader comprising:
   a housing having a lower housing and an upper housing extending above the lower housing;
   a weigh platter positioned within the lower housing and configured to measure a weight of an object placed on the weigh platter, the weigh platter having an upper surface facing a product scanning region, a proximal edge adjacent the upper housing, a first lateral edge extending non-parallel to the proximal edge, a second lateral edge, opposite the first lateral edge, extending non-parallel to the proximal edge, and a distal edge, opposite the proximal edge, extending non-parallel to the first lateral edge and the second lateral edge; and an off-platter detection assembly comprising:
an overhead imaging assembly positioned above the weigh platter and including an imager having a field-of-view extending downward towards the upper surface of the weigh platter, the field-of-view having a central axis that extends perpendicular to the upper surface, the imager configured to capture an image of the upper surface of the weigh platter, including the first lateral edge and the second lateral edge, within the field-of-view; and
a controller in communication with the imaging assembly, the controller configured to:
identify and locate the first and second lateral edges based upon a training image of the upper surface of the weigh platter within the field-of-view, the training image comprising an image of the weigh platter without an object and the first and second lateral edges within the field-of-view;
receive the image from the imager;
allow the measured weight to be recorded by a host system operatively coupled to the controller in response to the controller determining that an object positioned on the weigh platter does not extend over the first and second lateral edges based on the image; and
prevent the measured weight from being recorded by the host system and/or providing an alert to a user in response to the controller determining that the object positioned on the weigh platter does extend over the first and/or second lateral edges based on the image.

10. The barcode reader of claim 9, wherein a proximal boundary of the field-of-view intersects the upper surface of the weigh platter at or substantially adjacent to the proximal edge.

11. The barcode reader of claim 10, wherein the proximal boundary of the field-of-view intersects the upper surface of the weigh platter within the range of 0 mm to the proximal edge and 30 mm to the proximal edge.

12. The barcode reader of claim 9, wherein the field-of-view comprises a transverse field-of-view angle within the range of 100 degrees and 135 degrees.

13. The barcode reader of claim 9, wherein the barcode reader comprises a gooseneck post that extends from a back of the housing and extends over the weigh platter and the imaging assembly is positioned within the gooseneck post.

14. The barcode reader of claim 9, wherein the barcode reader is a bioptic barcode reader and comprises:
a generally horizontal window positioned at the upper surface of the lower housing, the generally horizontal window configured to allow a first light to pass between the product scanning region and an interior region of the housing; and
a generally upright window positioned in the upper housing, the generally upright window configured to allow a second light to pass between the product scanning region and the interior region of the housing.

15. A barcode reader configured to be supported by a workstation, the barcode reader comprising:
a housing having a lower housing and an upper housing extending above the lower housing;
a weigh platter positioned within the lower housing and configured to measure a weight of an object placed on the weigh platter, the weigh platter having an upper surface facing a product scanning region, a proximal edge adjacent the upper housing, a first lateral edge extending non-parallel to the proximal edge, a second lateral edge, opposite the first lateral edge, extending non-parallel to the proximal edge, and a distal edge, opposite the proximal edge, extending non-parallel to the first lateral edge and the second lateral edge; and
an off-platter detection assembly comprising:
an imaging assembly positioned within the upper housing and including a first imager having a first field-of-view extending over the upper surface of the weigh platter, the first field-of-view having an upper boundary, a lower boundary that extends generally parallel to the upper surface, a first lateral boundary, and a second lateral boundary, the first imager configured to capture a first image of the first lateral edge and the second lateral edge of the weigh platter within the first field-of-view;
an overhead imaging assembly positioned above the weigh platter and including a second imager having a second field-of-view extending downward towards the upper surface of the weigh platter, the second field-of-view having a central axis that extends perpendicular to the upper surface, the second imager configured to capture a second image of the upper surface of the weigh platter, including the first lateral edge and the second lateral edge, within the second field-of-view; and
a controller in communication with the imaging assembly and the overhead imaging assembly, the controller configured to:
identify and locate the first and second lateral edges based upon a first training image of the upper surface of the weigh platter within the first field-of-view, the first training image comprising an image of the weigh platter without an object and the first and second lateral edges within the first field-of-view;
identify and locate the first and second lateral edges based upon a second training image of the upper surface of the weigh platter within the second field-of-view, the second training image comprising an image of the upper surface of the weigh platter without an object and the first and second lateral edges within the second field-of-view;
receive the first image from the first imager and the second image from the second imager;
allow the measured weight to be recorded by a host system operatively coupled to the controller in response to: (1) the controller determining that a footprint of an object positioned on the weigh platter does not extend over the first and second lateral edges based on the first image; and/or (2) the controller determining that the object positioned on the weigh platter does not extend over the first and second lateral edges based on the second image; and
prevent the measured weight from being recorded by the host system and/or providing an alert to a user in response to: (1) the controller determining that the footprint of the object does extend over one of the first and/or second lateral edges based on the first image; and (2) the controller determining that the object does extend over the one of the first and/or second lateral edges based on the second image.

16. The barcode reader of claim 15, wherein the first field-of-view has a central axis that extends upward above the upper surface and the lower boundary of the first field-of-view is substantially adjacent and substantially parallel to the upper surface.

17. The barcode reader of claim 16, wherein central axis is aimed upward away from the upper surface at an angle within the range of 15 degrees and 25 degrees relative to the upper surface.

18. The barcode reader of claim 15, wherein the first field-of-view comprises a field-of-view angle within the range of 100 degrees and 135 degrees.

19. The barcode reader of claim 15, wherein the first field-of-view has a central axis that is aimed downward towards the upper surface of the weigh platter.

20. The barcode reader of claim 19, wherein the lower boundary of the first field-of-view intersects the upper surface of the weigh platter at or substantially adjacent to the proximal edge.

21. The barcode reader of claim 20, wherein the lower boundary of the first field-of-view intersects the upper surface of the weigh platter within the range of 0 mm to the proximal edge and 30 mm to the proximal edge.

22. The barcode reader of claim 15, wherein a proximal boundary of the second field-of-view intersects the upper surface of the weigh platter at or substantially adjacent to the proximal edge.

23. The barcode reader of claim 22, wherein the proximal boundary of the second field-of-view intersects the upper surface of the weigh platter within the range of 0 mm to the proximal edge and 30 mm to the proximal edge.

24. The barcode reader of claim 15, wherein the second field-of-view comprises a transverse field-of-view angle within the range of 100 degrees and 135 degrees.

25. The barcode reader of claim 15, wherein the barcode reader comprises a gooseneck post that extends from a back of the housing and extends over the weigh platter and the imaging assembly is positioned within the gooseneck post.

26. The barcode reader of claim 15, wherein the barcode reader is a bioptic barcode reader and comprises:
   a generally horizontal window positioned at the upper surface of the lower housing, the generally horizontal window configured to allow a first light to pass between the product scanning region and an interior region of the housing; and
   a generally upright window positioned in the upper housing, the generally upright window configured to allow a second light to pass between the product scanning region and the interior region of the housing.

* * * * *